Jan. 1, 1952
W. H. GILLE
2,581,093
SPEED RESPONSIVE GENERATOR
Filed Jan. 21, 1950
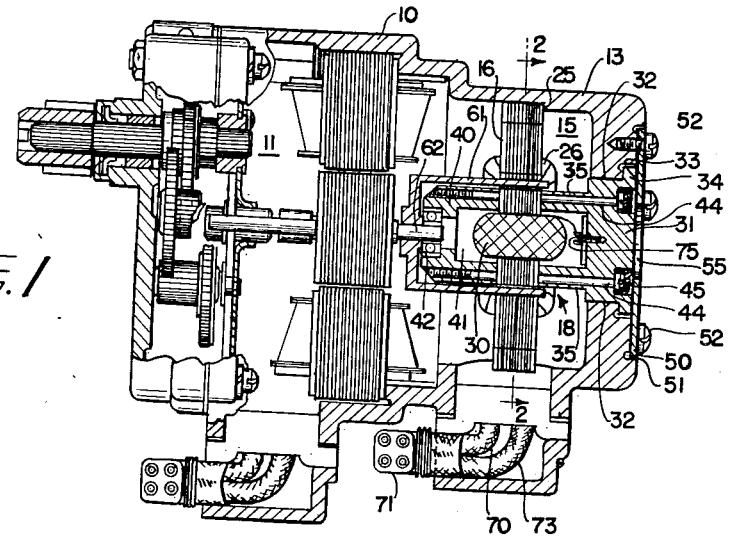
FIG. 1
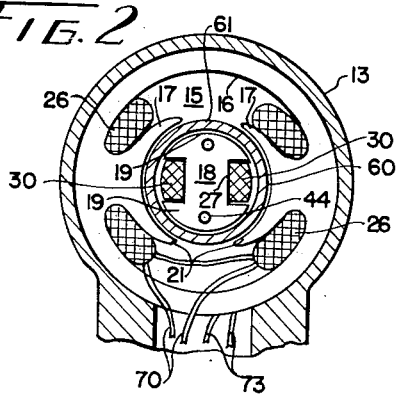
FIG. 2
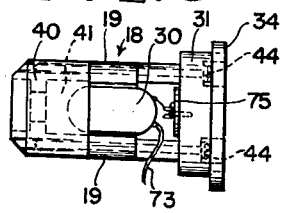
FIG. 3
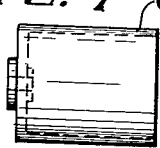
FIG. 4
FIG. 5
Inventor
WILLIS H. GILLE
By George H Fisher
Attorney Patented Jan. 1, 1952

2,581,093

UNITED STATES PATENT OFFICE 2,581,093

SPEED RESPONSIVE GENERATOR

Willis H. Gille, St. Paul, Minn., assignor to Minneapolis-Honeywell Regulator Company, Minneapolis, Minn., a corporation of Delaware Application January 21, 1950, Serial No. 139,937

7 Claims. (Cl. 171—209)

My invention relates to signal generators and more particularly to an improved signal generating device of the alternating current type whose signal output is of constant frequency and is proportional to the speed of rotation of a prime mover which drives the same. While signal generators of this type, known as "velocity generators," are not new in the art, they are generally complex in structure. Further, they are subject to a disadvantage in that they have an extraneous signal output generally called a zero signal when the prime mover is at a standstill. This limits the application of such a device and introduces error in systems where they are used.

The present invention provides an improved velocity generator design which overcomes these disadvantages. The subject generator comprises a primary core or pole structure with an energizing winding thereon and a secondary core or pole structure with a secondary or output winding thereon separated from the primary by an annular air gap within which a cylindrical or short-circuited electrical conductor is positioned to be drivingly rotated by a prime mover. The secondary core member is so mounted to be relatively adjusted with respect to the primary core structure thereby eliminating extraneous signal output when the prime mover is at a standstill.

It is an object of this invention to provide an improved velocity generator which has an output directly proportional to the speed of the prime mover and of the same frequency as the energizing current.

It is another object of this invention to provide an improved velocity generator which is simple in design and manufacture, compact in construction and which requires little or no maintenance.

It is also an object of this invention to provide an improved means of adjustment in a velocity generator to substantially eliminate zero signal.

It is further an object of this invention to provide in a velocity generator design an arrangement of parts which substantially eliminates the effect of stray flux upon the signal output.

These and other objects of this invention will become apparent from a reading of the attached description together with the drawings wherein:

Figure 1 is a side elevation view in section of the velocity generator attached to a prime mover, Figure 2 is an end elevation view in section of the subject velocity generator showing the relationship and position of parts, Figure 3 is a view of the secondary core structure and its mountings, Figure 4 is a detailed view of the rotor of the generator, and Figure 5 is an end elevation view in section of another embodiment of the subject generator design.

My improved velocity generator is designed to produce alternating current voltages primarily for controlling purposes as a function of rotational speed of the driving member without requiring any appreciable driving torque from said driving member. As such it is usually mounted on and driven by a motor or prime mover whose speed it is desired to control in a manner such as shown in the Riggs Patent 2,115,086.

Figure 1 discloses in section a typical method of mounting the subject generator in a casing 10 which houses a motor 11 of any conventional type. An extension 13 of motor casing 10 permits the mounting of my improved speed responsive generator indicated at 15 in a tandem relationship with the motor 11.

Generator 15 comprises a primary core structure or yoke 16 having poles 17 formed thereon and a secondary core structure or member 18 with poles 19 thereon held in assembled relationship by means of the extension 13 of casing 10 which forms a frame upon which the core structures are mounted. The primary core structure or yoke 16 is made up of laminated magnetic material stamped to form an annular ring with the two inwardly projecting or salient pole piece sections which form the salient poles 17 of the primary core structure disposed diametrically opposite one another. Poles 17 have curved pole faces as at 21 to form a circular opening therebetween. The laminations forming the yoke 16 are held together by any suitable means such as rivets, not shown, and are positioned within the extension 13 of casing 10 in a suitable manner, such as by press fitting. The interior of extension 13 has a shoulder or ridge formed therein, as at 25, against which the yoke 16 abuts to actively position the yoke within the casing 10. Mounted on the poles 17 of yoke 16 are a pair of form wound windings or energizing coils 26 which are adapted to be energized from an alternating current source of power, the coils being connected in either a series or parallel connection. When energized, the diametrically opposed poles 17 are energized with opposite magnetic polarities.

Secondary core structure 18 as shown in Figures 1 and 2, is positioned within the circular opening formed by the pole 17 of the primary core structure. The secondary core structure 18 comprises two outwardly projecting pole piece members 19 connected by a centrally located portion 27 in the form of an I-shaped member with sector like pole piece tips. The secondary core structure is similarly formed of laminated magnetic material held together by any suitable means such as rivets (not shown). A single secondary winding 30 is wound around the centrally located portion 27 connecting the pole tips or poles 19 of the secondary core structure. However, if desired, two such windings may be formed to occupy the same space, the windings being connected in series with one another and each common to one of the respective poles 19. As will be noted below, the number of secondary windings supplied will depend upon the number of poles formed by the secondary core structure. For the sake of convenience, a single secondary winding common to both poles 19 of the secondary core member 18 is employed when a two-pole unit is used.

Secondary core 18 is mounted on the extension 13 of casing 10 by means of a mounting bracket 31 which fits through a circular opening 32 in the end of casing 13. It is positioned therein by means of a shoulder portion 33 in the end of the casing surrounding opening 32 which cooperates with a flange portion 34 on bracket 31. Flange 34 when fitted into the shoulder portion 33 of casing extension 13 serves to space secondary core structure 18 within the extension 13 casing 10 such that the primary and secondary pole laminations are disposed to the same plane. Projecting from the main body of the mounting bracket 31 and integral therewith are two spacer members 35 shaped to conform with the tips of the poles 19 and designed to abut the surface of the secondary pole piece structure. Positioned on the opposite side of the secondary core structure 18 is a bearing mount 40, cylindrical in form, and having an aperture 41 at one extremity thereof common to the secondary core piece structure which accommodates the end of coil 30. The opposite end of mount 40 has a similar aperture therein into which a bearing ring 42 is positioned. Pole piece structure 18 is mounted on bracket 31 and between the bearing mount 40 and the bracket 31 by means of screws 44 which thread through apertures in the bracket 31, pole piece structure 18 and bearing mount 40 to secure the three in assembled relationship as shown in Figures 1 and 3. When assembled, these screws are covered with a sealing compound such as is indicated at 45 such that they will not be confused with the means permitting relative adjustment between the primary and secondary core structure to be described below.

A cover plate mounted in a recess 51 in the extension 13 of casing 10 covers the mounting flange 31, abutting the same. Cover plate 50 is secured within the recess 51 of the extension 13 by means of screws indicated at 52 which thread into suitable tapped openings in the extension 13 of casing 10. In this manner mounting bracket 31 is held within the opening in the casing 10 to positively position the secondary core structure 18 with respect to the primary core structure 15 and rigidly maintains such relationship. Adjustment may be made in the relative positions of the primary and secondary core structures by loosening the screws 52 holding plate 50 into engagement with the casing 13 and bracket 31. An opening 55 is provided in plate 50 such that a suitable tool may engage a tool receiving recess (not shown) in the bracket 31 to rotate the mounting bracket and secondary core structure about its mounting position. The purpose of this adjustment will be described below. The relative positioning of the secondary core structure 18 and primary core structure 15 defines an annular air gap indicated at 60 into which a rotor 61 is positioned.

Rotor 61 is a short-circuited conductor member of electrically conductive material, such as aluminum, formed in the shape of a cylindrical cup which encircles the bearing mount 40 and pole piece structure 18 and is adapted to rotate within said annular air gap 60. A shaft 62 extends through and is secured to the closed end of the cup to mount the rotor in this position. Shaft 62 is a continuation of the shaft which mounts the rotor of the motor or prime mover to be controlled, the shaft extending into the cup and being journalled in the bearing 42 mounted in the bearing mount 40. The opposite end of the shaft 62 which carries the rotor 61 and the rotating element of the prime mover may be journalled in the motor casing 10 in any suitable manner. Thus positioned, the rotor 61 is adapted to be rotated by the rotating element of the prime mover within the air gap 60 formed by the primary 15 and second 18 core structures at the speed of rotation of the prime mover.

The primary coils 26 mounted on the poles 17 of the primary core structure 15 are adapted to be energized, as noted above, from an alternating current source of power through lead connections, such as is shown at 70 which connect to a suitable connector member 71 mounted on the casing 13. The secondary coil or coils 30 mounted on the poles 19 of secondary core structure 18 are similarly adapted to be connected to the connector 71 through lead connections such as is shown at 73 in Figures 1 and 2. In certain instances it may be desirable to ground one side of the secondary coil for circuit simplicity and such a connection may be made to the mounting bracket 31 in the manner indicated at 75.

In Figure 5 a modification of the subject velocity generator is schematically shown. In this modification, the primary core structure 90 is formed with four salient pole members 91 and the secondary core structure 92 similarly employs four secondary poles indicated at 93. Energizing windings are provided for the primary structure as indicated at 94, these windings being adapted to be connected in series or parallel relationship from an alternating source of current to generate a primary flux which in the manner to be described below is cut by the rotating conductor member 61. The secondary poles 93 are also provided with secondary windings 95 each pole having a winding encircling the pole and adapted to be connected in a series relationship. The primary and secondary core structures 90 and 92 are so positioned that the poles thereon are spaced opposite or adjacent the spacings between poles on the opposite member. An annular air gap 60 is defined by the relative positioning of the primary and secondary core structures and within this air gap the cup-shaped rotor 61 is positioned and disposed to rotate in the manner described above.

In operation, the subject velocity generator is unlike the conventional generator in that a negligible amount of power is required to drive the same. With the coils 26 of primary core structure 15 energized by an alternating current, a magnetic flux is created or generated in the poles 17. These flux lines traverse the air gap 60 formed between the primary and secondary core structures 15 and 18 respectively and enter the secondary core structure 18. With the rotor or short-circuited conductor member 61 at standstill, the flux lines pass through the rotor and secondary core structure returning to the primary core structure by traversing the air gap 60 without threading the secondary winding 30 to generate a current therein. This condition is particular to the two-pole secondary core structures of Figures 1, 2 and 3, since the axis of the secondary poles and secondary winding is normal to the axis of the primary poles and primary winding. For this reason no secondary output is obtained. Should this particular arrangement of primary and secondary poles and windings not be present, a certain portion of the primary flux will thread the secondary winding generating a signal therein known as zero signal. Such zero signal may be eliminated or balanced out by loosening plate 50 mounted on extension 13 of casing 10 and adjusting the relative position of the inner secondary pole piece structure 18 relative to the primary pole piece structure 15 in the manner described above until the axis of the primary and secondary core structure are so located. As the rotor 61 is rotated or driven by the prime mover, the primary flux generated by the primary windings 26 will be cut by the rotating short-circuited conductor member inducing therein a current. This current will generate a quadrature flux which will thread the secondary winding to a greater or lesser degree depending upon the field distortion caused by the speed of rotation of the rotor. This quadrature flux as it threads the secondary winding induces a current therein which current is proportional to the speed of rotation of the prime mover and the rotor and which is further of constant frequency and of the same frequency as that current energizing the primary windings.

When more than two poles are employed in the primary and secondary core structures as suggested in the modification of Figure 5, the primary and secondary poles are no longer normal to one another. As in the embodiment of Figures 1–3 they, however, are spaced adjacent the spacings between the poles on the opposite core structures and equal distant therefrom. The primary poles are so energized that opposite magnetic polarities exist in consecutively spaced poles. The primary flux generated from the energized primary windings, when primary and secondary poles are equidistantly separated, will then thread only the secondary pole tips 93 with rotor 61 at a standstill. Therefore, a non-inductive relationship between primary and secondary coils is present in this modification when such a relationship between core structures is obtained. A similar adjustment may be made to the secondary core structure 92 to maintain relative position with the primary core structure 90 as was shown in Figure 1 and described above. As rotor 61 of this modification is rotated by the prime mover, the current induced in the short-circuited conductor or rotor generates a quadrature flux which acts in the same manner as it does with a two-pole structure as described above. The signal output obtained from the multiple pole secondary unit will be proportional to the speed of the prime mover and of constant frequency similar to the energizing current supplied to the primary windings 94.

In considering this invention it should be kept in mind that this disclosure is intended to be illustrative only and the scope of this invention is to be determined only by the appended claims.

I claim as my invention:

1. In an alternating current generator, a yoke member, a primary core structure mounted on said yoke and including a plurality of salient pole members each with an energizing winding thereon which is adapted to be energized by a constant source of alternating current, said salient pole members defining an opening therebetween, a secondary core structure positioned within said opening formed by said poles of said primary core structure and mounted on said yoke to define an annular air gap between said primary and secondary core structures, a plurality of outwardly projecting pole members formed on said secondary core structure and having a winding thereon so positioned as to be in substantially non inductive relationship with said primary energizing winding and terminating in a pair of output terminals, a cup shaped member of electrically conductive material positioned in said annular air gap encircling said secondary core structure and adapted to be rotated within said air gap to provide an inductive linkage between said primary and secondary windings, and means for rotating said cup shaped conductor.

2. In an alternating current generator, a yoke member, a primary core structure mounted on said yoke and including a plurality of salient pole members each with an energizing winding thereon which is adapted to be energized by a constant source of alternating current, said salient pole members defining an opening therebetween, a secondary core structure positioned within said opening formed by said poles of said primary core structure to define an annular air gap between said primary and secondary core structures, means adjustably mounting said secondary core structure on said yoke to permit rotational adjustment of said secondary core structure relative to said primary core structure, a plurality of outwardly projecting pole members formed on said secondary core structure and having a winding thereon so positioned as to be in substantially non inductive relationship with said primary energizing winding and terminating in a pair of output terminals, a cup shaped member of electrically conductive material positioned in said annular air gap encircling said secondary core structure and adapted to be rotated within said air gap to provide an inductive linkage between said primary and secondary windings, and means for rotating said cup shaped conductor.

3. In an alternating current generator, a stationary primary core structure having a plurality of poles thereon and an aperture therein, a winding mounted on said primary core structure and adapted to be energized from an alternating current source of power, a stationary secondary core structure mounted within said aperture of said primary core structure and having poles thereon normally positioned intermediate the spacings of said poles on said primary core structure and apart from said primary core structure to define an air gap therebetween, a secondary winding positioned on said secondary core structure to be in substantial non inductive relationship with said primary winding, said secondary winding being connected to output terminals, a short circuited conductor member positioned in said air gap and adapted to inductively couple said primary and secondary windings upon rotation within said air gap, and means for rotating said conductor member within said air gap.

4. In an alternating current generator, a stationary primary core structure having a plurality of poles thereon and an aperture therein, a winding mounted on said primary core structure and adapted to be energized from an alternating current source of power, a secondary core structure positioned within said aperture of said primary core structure and having poles thereon projecting outwardly toward said primary core structure and apart from said primary core structure to define an air gap therebetween, means mounting said secondary core structure within said primary core structure and permitting rotational adjustable movement of said secondary core structure relative to said primary core structure, a secondary winding positioned on said secondary core structure to be in substantial non inductive relationship with said primary winding, said secondary winding being connected to output terminals, a short circuited conductor member positioned in said air gap and adapted to inductively couple said primary and secondary windings upon rotation within said air gap, and means for rotating said conductor member within said air gap.

5. In an alternating current generator, a stationary primary core structure having a plurality of poles thereon and an aperture therein, a winding mounted on said primary core structure and adapted to be energized from an alternating current source of power, a stationary secondary core structure mounted within said aperture of said primary core structure and having poles thereon projecting outwardly toward said primary core structure and apart from said primary core structure to define an air gap therebetween, a secondary winding positioned on said secondary core structure to be in substantial non inductive relationship with said primary winding, said secondary winding being connected to output terminals, a short circuited conductor member positioned in said air gap and adapted to inductively couple said primary and secondary windings upon rotation within said air gap, and means for rotating said conductor member within said air gap.

6. In an alternating current generator, a frame member, a primary core structure mounted on said frame member and including a plurality of salient pole members with energizing windings thereon, said energizing windings being adapted to be energized by an alternating current of fixed frequency to create a primary flux therein, said salient pole members being disposed in said frame to define a circular opening therebetween, a secondary core structure positioned within said circular opening of said primary core structure to define an annular air gap therebetween, means mounting said secondary core structure on said frame member and permitting adjustable relative movement between said primary and secondary core structures, said secondary core structure including a plurality of outwardly projecting pole members spaced between said primary salient pole members and having a secondary winding mounted thereon encircling said secondary pole members, means connecting said secondary winding to a pair of output terminals, a short-circuited conductor member of electrically conductive material mounted in said annular air gap and adapted to be rotated therein at variable speeds, and means for rotating said conductor member within said air gap, said primary flux created by said primary windings traversing said annular air gap and adapted to be cut by said rotating short-circuited conductor to generate therein a current which sets up in said conductor a quadrature flux threading said secondary winding, said secondary winding having a potential generated therein and impressed on said output terminals from said quadrature flux which is of fixed frequency and variable magnitude proportional to the speed of said conductor.

7. In an alternating current generator, a frame member, a primary core structure mounted on said frame member and including a plurality of salient pole members, a plurality of windings mounted on said salient pole members and adapted to be energized with an alternating current of fixed frequency, said salient pole members defining a circular opening therebetween, a secondary core structure positioned within said circular opening of said primary core structure to define an annular air gap therebetween, means adjustably mounting said secondary core structure on said frame member to permit adjustable relative movement between said primary and secondary core structures, said secondary core structure including a plurality of pole members spaced substantially between said primary salient pole members and having a secondary winding mounted thereon encircling said secondary pole members and extending axially thereof, means connecting said secondary winding to output terminals, and a cup-shaped rotor member of electrically conductive material positioned in said annular air gap encircling said secondary core structure, said cup-shaped rotor member being adapted to be driven by a prime mover at variable speeds, said secondary winding having generated therein as said rotor member is rotated in said annular air gap a signal output and impressed on said output terminals which is variable in magnitude in proportion to the speed of said prime mover.

WILLIS H. GILLE.

REFERENCES CITED

The following references are of record in the file of this patent:

UNITED STATES PATENTS

| Number | Name | Date |
| --- | --- | --- |
| 698,645 | Duncan | Apr. 29, 1902 |
| 717,497 | Cuenod | Dec. 30, 1902 |
| 1,998,142 | Meyertons | Apr. 16, 1935 |